United States Patent
Berman et al.

(10) Patent No.: US 8,416,537 B2
(45) Date of Patent: Apr. 9, 2013

(54) RECORDING HEAD WITH TILTED ORIENTATION

(75) Inventors: David Berman, San Jose, CA (US); Robert G. Biskeborn, Hollister, CA (US); Michel Despont, Zurich (CH); Philipp Herget, San Jose, CA (US); Wayne Isami Imaino, San Jose, CA (US); Pierre-Olivier Jubert, San Jose, CA (US); Peter V. Koeppe, San Diego, CA (US); Chandrasekhar Narayan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 12/614,275

(22) Filed: Nov. 6, 2009

(65) Prior Publication Data

US 2011/0109998 A1    May 12, 2011

(51) Int. Cl.
   *G11B 5/39* (2006.01)
(52) U.S. Cl.
   USPC ............................................. 360/316; 360/121
(58) Field of Classification Search .................. 360/316, 360/322, 327.1, 121, 313, 324, 324.1, 324.12, 360/327, 327.11; 29/603.14
   See application file for complete search history.

(56) References Cited

U.S. PATENT DOCUMENTS

| | | | |
|---|---|---|---|
| 3,846,841 A | 11/1974 | Lazzari et al. | |
| 4,176,384 A | 11/1979 | Yang | |
| 4,233,637 A | 11/1980 | Kubota | |
| 4,451,862 A | 5/1984 | Rijckaert et al. | |
| 4,855,854 A | 8/1989 | Wada et al. | |
| 4,891,725 A * | 1/1990 | Mowry | 360/327.32 |
| 4,949,207 A | 8/1990 | Lazzari et al. | |
| 4,956,736 A * | 9/1990 | Smith | 360/327 |
| 5,067,230 A | 11/1991 | Meunier et al. | |
| 5,260,652 A * | 11/1993 | Collver et al. | 324/252 |
| 5,283,942 A | 2/1994 | Chen et al. | |
| 5,381,291 A * | 1/1995 | Madsen et al. | 360/327.1 |
| 5,483,402 A * | 1/1996 | Batra | 360/322 |
| 5,592,082 A * | 1/1997 | Kuriyama | 324/252 |
| 5,655,286 A | 8/1997 | Jones, Jr. | |

(Continued)

FOREIGN PATENT DOCUMENTS

| | | |
|---|---|---|
| EP | 1 748 283 A2 | 1/2007 |
| JP | 57 208621 | 12/1982 |

OTHER PUBLICATIONS

Chapman, et al., "A New Horizontal MR Head Structure", IEEE Transactions on Magnetics, vol. 25, No. 5, Sep. 1989, pp. 3689-3691.
English abstract of JP 57-208621 published Dec. 21, 1982, 1 pp.

(Continued)

*Primary Examiner* — Angel A. Castro
(74) *Attorney, Agent, or Firm* — William K. Konrad; Konrad Raynes Davda & Victor LLP (57) ABSTRACT

In one embodiment, a read sensor for a recording head for a magnetic media storage system, has first and second shields, and a magneto-resistive sensor disposed between and shielded by the first and second shields in which the sensing axis of the sensor is tilted with respect to the recording surface of the head. In one embodiment, the sensing axis is oriented at an angle between 10 and 60 degrees with respect to the normal of the recording surface. Other embodiments are described and claimed.

35 Claims, 9 Drawing Sheets

U.S. PATENT DOCUMENTS

| | | | |
|---|---|---|---|
| 5,682,284 A * | 10/1997 | George | 360/322 |
| 5,712,565 A * | 1/1998 | Schultz et al. | 324/252 |
| 5,739,988 A * | 4/1998 | Gill | 360/324.12 |
| 5,757,589 A | 5/1998 | Kang | |
| 5,828,531 A * | 10/1998 | Gill | 360/324.12 |
| 5,910,869 A | 6/1999 | Fedeli | |
| 5,926,348 A | 7/1999 | Shouji et al. | |
| 6,122,445 A | 9/2000 | Yamada | |
| 6,198,607 B1 | 3/2001 | Cain et al. | |
| 6,282,067 B1 * | 8/2001 | Machida et al. | 360/316 |
| 6,289,564 B1 | 9/2001 | Novotny | |
| 6,381,104 B1 | 4/2002 | Soeno et al. | |
| 6,426,853 B1 * | 7/2002 | Sakai et al. | 360/324.11 |
| 6,473,273 B1 | 10/2002 | Kikuiri | |
| 6,477,018 B1 | 11/2002 | Terunuma | |
| 6,493,191 B1 | 12/2002 | Cain et al. | |
| 6,501,619 B1 | 12/2002 | Sherrer et al. | |
| 6,650,496 B2 | 11/2003 | Nozieres et al. | |
| 6,687,977 B2 | 2/2004 | Knapp et al. | |
| 6,785,096 B2 | 8/2004 | Kuwajima et al. | |
| 6,842,313 B1 | 1/2005 | Mallary | |
| 6,895,657 B2 | 5/2005 | Mishima et al. | |
| 6,943,990 B1 | 9/2005 | Yokoyama et al. | |
| 7,064,933 B2 | 6/2006 | Macken et al. | |
| 7,100,266 B2 | 9/2006 | Plumer et al. | |
| 7,126,330 B2 | 10/2006 | Peczalski et al. | |
| 7,130,159 B2 | 10/2006 | Shimizu et al. | |
| 7,151,650 B2 | 12/2006 | Lee | |
| 7,170,718 B2 | 1/2007 | Sakamoto et al. | |
| 7,221,157 B2 * | 5/2007 | Wakabayashi et al. | 324/251 |
| 7,358,722 B2 * | 4/2008 | Peczalski et al. | 324/247 |
| 7,492,554 B2 * | 2/2009 | Breuer et al. | 360/313 |
| 7,532,437 B2 * | 5/2009 | Liu et al. | 360/234.7 |
| 7,779,535 B2 | 8/2010 | Kanaya et al. | |
| 8,110,119 B2 * | 2/2012 | Breuer et al. | 216/22 |
| 2003/0208901 A1 | 11/2003 | Lim et al. | |
| 2005/0235483 A1 | 10/2005 | Biskeborn et al. | |
| 2005/0264944 A1 | 12/2005 | Fontana, Jr. et al. | |
| 2006/0171081 A1 | 8/2006 | Brcuer et al. | |
| 2006/0176142 A1 | 8/2006 | Naito et al. | |
| 2006/0256471 A1 | 11/2006 | Plumer et al. | |
| 2007/0047143 A1 | 3/2007 | Matsumoto | |
| 2011/0047785 A1 | 3/2011 | Biskeborn et al. | |
| 2011/0051284 A1 | 3/2011 | Herget et al. | |

OTHER PUBLICATIONS

English translation of JP 57-208621 published Dec. 21, 1982, 5 pp.

Ho, et al., "Study of Longitudinal Stabilization Using In-Stack Biasing", IEEE Transactions on Magnetics, vol. 40, No. 1, Jan. 2004, pp. 189-194.

Lamberton, et al., "Current-in-Plane GMR Trilayer Head Design for Hard-Disk Drives: Characterization and Extendibility", IEEE Transactions on Magnetics, vol. 43, No. 2, Feb. 2007, pp. 645-650.

Lazzari, "Planar Silicon Heads/Conventional Thin Film Heads Recording Behavior Comparisons", IEEE Transactions on Magnetics, vol. 32, No. 1, Jan. 1996, pp. 80-83.

Nozieres, et al., "Planar GMR Head Design for 50+ Gbit/in2 Recording", Journal of Magnetism and Magnetic Materials, 242-245 (2002) 341-344.

Tamakawa, et al., "Multichannel Write and GMR Heads for Over 1 TB Tape System", IEEE Transactions on Magnetics, vol. 42, No. 10, Oct. 2006, pp. 2324-2326.

J.C. Mallinson, "Magneto-Resistive Heads: Fundamentals and Applications", Academic Press, Inc., 1996, pp. 1-9.

M. Madou et al., "Fundamentals of MIcrofabrication", CRC Press, 1997, pp. 1-11.

Church, et al., "Integrated Magnetoresistive Read Inductive Write Film Magnetic Head Assembly", IBM TDB 12-83, pp. 3366-3367.

First Office Action dated Oct. 31, 2011, pp. 1-8, for U.S. Appl. No. 12/547,224, filed Aug. 25, 2009.

Response dated Dec. 1, 2011, pp. 1-8, to First Office Action dated Oct. 31, 2011, pp. 1-8, for U.S. Appl. No. 12/547,224, filed Aug. 25, 2009.

Final Office Action dated Jan. 30, 2012, pp. 1-17, for U.S. Appl. No. 12/547,224, filed Aug. 25, 2009.

Response dated Mar. 23, 2012, pp. 1-3, to Final Office Action dated Jan. 30, 2012, pp. 1-17, for U.S. Appl. No. 12/547,224, filed Aug. 25, 2009.

Notice of Allowance dated Apr. 2, 2012, pp. 1-10, for U.S. Appl. No. 12/547,224, filed Aug. 25, 2009.

Supplemental Notice of Allowance dated May 14, 2012, pp. 1-7, for U.S. Appl. No. 12/547,224, filed Aug. 25, 2009.

First Office Action dated Jan. 24, 2012, pp. 1-7, for U.S. Appl. No. 12/547,246, filed Aug. 25, 2012.

Response dated May 20, 2012, pp. 1-5 to First Office Action dated Jan. 24, 2012, pp. 1-7, for U.S. Appl. No. 12/547,246, filed Aug. 25, 2009.

Final Office Action dated May 30, 2012, pp. 1-9, for U.S. Appl. No. 12/547,246, filed Aug. 25, 2009.

\* cited by examiner

RECORDING HEAD WITH TILTED ORIENTATION

BACKGROUND

Data storage on magnetic tape is well known and tape recorders have been used to record data tracks on magnetic tape. Traditionally, data are recorded in a plurality of parallel data tracks on the magnetic tape. The read/write or recording head is then positioned relative to the tape by moving the head to different track positions as desired. In such a system, the tape tracks are generally sufficiently wide and separated to facilitate reliably reading and writing the data.

Figure 11:
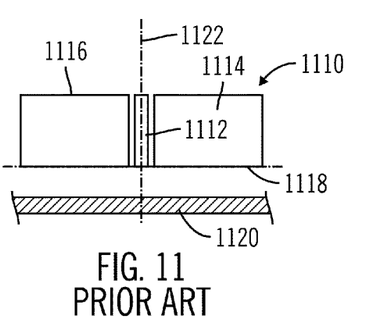
FIG. 11 illustrates a prior art read element having a nontilted sensing axis.

Recording heads for a tape system may be similar in design and operation to recording heads for disk drives. A recording head may have one or more write elements and one or more read elements for writing and reading data, respectively. FIG. 11 shows in schematic form one example of a current thin film read element 1110 of a tape head which includes a thin film magnetoresistive (MR) sensor 1112 disposed between two shield layers 1114, 1116. The bottom surface 1118 of the read element 1110 is typically polished to provide a recording surface facing the recording medium, such as a tape 1120. The thin film of the sensor 1112 defines a sensing axis 1122 which is orthogonal to the recording surface 1118 of the read element 1110.

Figure 12A:
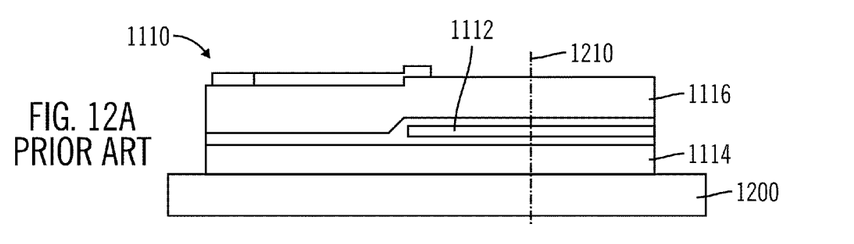
FIGS. 12a-12c illustrates a prior art process for forming a prior art read element having a nontilted sensing axis.

A thin film read element for a tape head such as the read element 1110 may be fabricated using standard film deposition techniques used in the semiconductor industry including chemical vapor deposition, atomic layer deposition, sputtering, plating, and standard processing techniques such as lithography, etching, chemical mechanical polishing, etc. FIG. 12a shows a first shield layer 1114 deposited on a substrate 1200 such as a wafer suitable for thin film deposition. A common shield layer material is permalloy. The layers of the thin film sensor 1112 are deposited on the first shield layer 1114. Depending upon the type of the thin film sensor, these layers may include one or more of magnetic layers including hard and free magnetic layers, intermediate layers, and pinning layers. Additional layers associated with and deposited adjacent to the sensor may include bias layers including hard bias layers, non-conducting layers and current lead layers. Suitable MR sensors include anisotropic magnetoresistive (AMR), giant magnetoresistive (GMR) and tunneling magnetoresistive (TMR) sensors. Deposited on the layers of the thin film sensor 1112 and its associated layers is a second shield layer 1116.

Figure 12B:
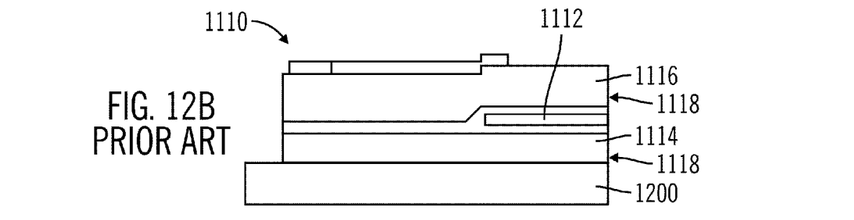
Figure 12C:
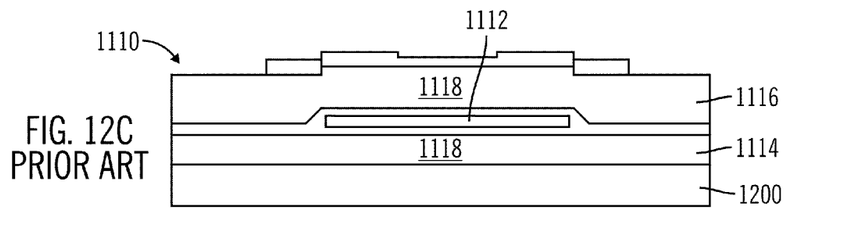

A plurality of read elements similar to the element 1110 may be deposited on the substrate 1200 in this manner. The wafer 1200 may then be diced into pieces to separate the various elements from each other. As represented by the line 1210 (FIG. 12a) one side edge of a piece carrying a read element 1110 may be polished to form a recording surface 1118 as shown in FIGS. 12b, 12c. In this manner, recording heads partially fabricated on a wafer may be diced from the wafer and lapped to provide a row-bar of recording heads. This row-bar may be attached to a flex cable and assembled into an actuator for track-following.

Figure 13:
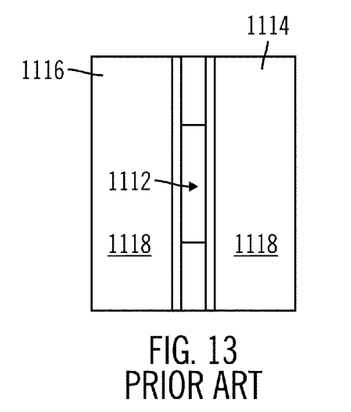
FIG. 13 is a view of the recording surface of a prior art read element.

FIG. 13 is a top view of one example of the recording surface 1118 of the read element 1110. The orientation of the gap between the shield layers 1114, 1116 and the orientation of the layers of the sensor 1112 between the shield layers 1114, 1116, defines a sensing axis 1122 (FIG. 12b) between the shield layers 1114, 1116. The sensing axis 1122 is generally parallel to the layers of the sensor 1112 and the shield layers 1114, 1116, and generally orthogonal to the recording surface 1118 (FIG. 11). The shield layers 1114, 1116 are typically formed of a high permeability material and are provided to screen the sensor 1112 from magnetic fields of transitions that are not below the gap between the shield layers 1114, 116. In this manner, the sensor 1112 is substantially sensitive to the vertical component of the magnetic field generated by the media 1120.

SUMMARY OF THE DESCRIPTION

In one embodiment, a read element for a head for a magnetic media storage system is formed by depositing a first shield layer on a wall. For example, the wall may extend from the surface of a substrate wherein the wall is tilted at an angle between 10 and 60 degrees with respect to the normal of the substrate surface. A plurality of layers forming a magnetoresistive sensor is deposited over the first shield layer and a second shield layer is deposited over the sensor layers. A recording surface is formed on the first and second shield layers wherein the recording head sensor has a sensing axis oriented at an angle between 10 and 60 degrees with respect to the normal of the recording surface.

In another aspect, a signal processing circuit is formed on the substrate adjacent the read element and below the level of the recording surface, and is coupled to at least one of an input and output of the read sensor. In yet another aspect, the substrate is a wafer, and the recording surface forming includes polishing the wafer, and the recording head forming further includes dicing the wafer to separate the recording heads from each other after the wafer polishing. In still another aspect, the recording surface forming further includes depositing a head wear protection coating on the polished wafer prior to dicing the wafer.

In still another aspect, grooves or vias are formed in the substrate and at least one of electrical leads and electronic devices are formed in the grooves and electrically coupled to the recording head sensor, prior to the wafer dicing.

In another aspect, a via is formed in the wafer and electrical leads are formed in the via, coupling a read sensor disposed on a front side of the wafer to a back side of the wafer, prior to the wafer dicing. In yet another aspect, the first and second shield layers and the sensor form a read element of the recording head, and a plurality of the read elements are formed in an array on an integral portion of the substrate of the wafer, the dicing including dicing the wafer so that the array of recording head elements is separated from the wafer as an integral unit on the integral portion of the substrate. In still another aspect, the array is a nonorthogonal array of the recording head sensors.

In another aspect, a first plurality of the read elements are formed with a gap between the associated shield layers oriented in a first direction in the recording surface, and a second plurality of the read elements are formed with a gap between the associated shield layers oriented in a second direction in the recording surface wherein the second direction is different from the first direction. In one example, the second direction is transverse to the first direction. In yet another aspect, the magnetic media storage system is a magnetic tape storage system. In still another aspect, the magneto-resistive sensor is one of an anisotropic magnetoresistive (AMR) sensor, giant magneto-resistive (GMR) sensor and a tunneling magnetoresistive (TMR) sensor.

In another aspect, data are transferred between a read element and a recording medium, the transferring including sensing magnetic fields using a magneto-resistive sensor of the read element having a sensing axis oriented at an angle between 10 and 60 degrees with respect to the normal of a recording surface of the recording head, the latter being substantially parallel to the recording medium. The sensor is shielded using first and second shields of the read element wherein the sensor is disposed in a gap between the first and second shields. In yet another aspect, the recording medium is a magnetic tape, and the transferring further includes transporting the tape longitudinally past the recording head from a first reel to a second reel.

In another aspect, the transferring includes transferring data between the recording head and a plurality of longitudinal tracks of the tape, the transferring further including actuating the recording head to move laterally from one track to another track of the tape. In still another aspect, the data transferring includes transferring data between a plurality of read elements of the recording head wherein the read elements are formed in an array on an integral substrate, wherein each read element of the array performs sensing magnetic fields using a magneto-resistive sensor of the element having a sensing axis oriented at an angle between 10 and 60 degrees with respect to the normal of a recording surface of the recording head. The sensor is shielded using first and/or second shields of the read element wherein the sensor is disposed in a gap between the first and second shields. In yet another aspect, an electrical signal for the read head is processed using processing circuitry disposed on the substrate on which the recording head is formed. The processing circuitry is disposed below the level of the recording surface of the recording head.

In another aspect, a read element for a magnetic media storage system comprises first and second shields; a recording surface adapted to be in close and controlled proximity to a recording medium; and a magneto-resistive sensor disposed between and shielded by the first and second shields, the sensor having a sensing axis oriented at an angle between 10 and 60 degrees with respect to the normal of the recording surface. In another aspect, the read sensor is formed on a substrate, and a signal processing circuit is formed on the substrate adjacent the recording head and coupled to at least one of an input and output of the recording head. The processing circuitry may be disposed below the level of the recording surface of the recording head.

Other embodiments are described and claimed. For example, although many of the embodiments are described in connection with a sensor having a sensing axis oriented at an angle between 10 and 60 degrees with respect to the normal of the recording surface, it is appreciated that other orientations may be utilized. For example, it is appreciated that each of the embodiments described herein may alternatively include a sensor having a sensing axis oriented at an angle within a range of 5 to 85 degrees with respect to the normal of the recording surface. The particular angle may vary, depending upon the particular application.

BRIEF DESCRIPTION OF THE DRAWINGS

Referring now to the drawings in which like reference numbers represent corresponding parts throughout.

DETAILED DESCRIPTION

In the following description of the exemplary embodiments, reference is made to the accompanying drawings which form a part hereof, and in which is shown by way of illustration specific embodiments which may be practiced. It is to be understood that other embodiments may be utilized as structural changes may be made without departing from the scope of the present description.

In one embodiment, a recording head for a magnetic media storage system is provided which, in accordance with one aspect of the present description, has one or multiple read elements, each of which includes a magneto-resistive sensor disposed between and magnetically shielded by first and second shields such that the sensing axis of the sensor is oriented at an angle between 10 and 60 degrees with respect to the normal of a recording surface of the head. As explained below, it is believed that such an arrangement can significantly facilitate recording head fabrication. It is appreciated that other features may be realized, depending upon the particular application.

Figure 1:
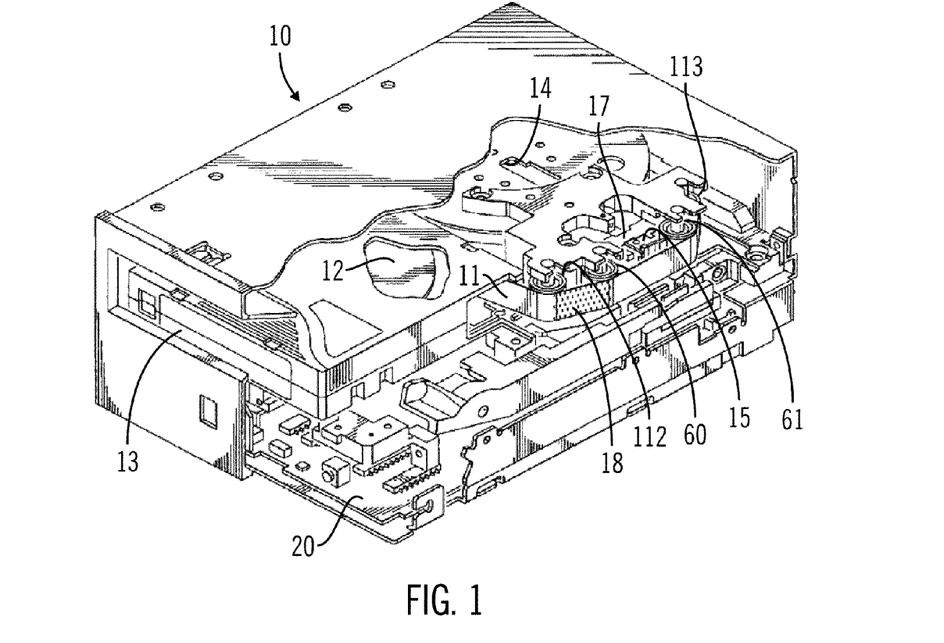
FIG. 1 illustrates one embodiment of a tape drive implementing a recording head in accordance with the present description.

FIG. 1 illustrates a tape drive 10, such as a magnetic tape drive, utilizing a tape recording head in accordance with one embodiment of the present description. Although the recording head is described in connection with a tape drive, it is appreciated that a recording head in accordance with the present description may be utilized with other magnetic recording and storage systems including disk drives.

Figure 2:
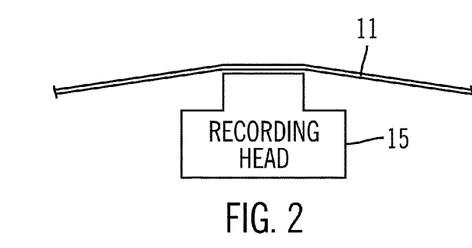
FIG. 2 illustrates one example of a recording head for use in a tape drive according to the present description.

In the tape drive 10, a magnetic tape 11 is moved along a tape path from a supply reel 12 in a magnetic cartridge 13 to a take up reel 14, the reels comprising drive reels of a drive system operated by drive motors. The magnetic tape 11 is moved along the tape path in a longitudinal direction across a tape head 15 as shown in FIG. 2. The tape head is supported by an actuator 17 of a servo system, which, for example, may comprise a compound actuator. The tape head 15, for example, a magnetic tape head, may comprise a plurality of read and write elements and a plurality of servo read elements. The tape may comprise a plurality of servo tracks or bands 18 which are recorded on the tape in the longitudinal direction on the tape which are parallel to the data tracks. The servo read elements are part of a track-following servo system for moving the tape head 15 in a lateral direction for following lateral movement of the longitudinal tracks as the tape 11 is moved in the longitudinal direction, and thereby position the tape head at the data tracks to follow the data tracks.

The compound actuator may comprise a coarse actuator, having a stepper motor, for example, and a fine actuator, having a voice coil motor, for example, mounted on the coarse actuator. It is appreciated that a tape head actuator in accordance with the present description may be used as a coarse actuator, fine actuator, or both, depending upon the particular application.

The tape drive 10 additionally comprises a controller 20 which provides the electronics modules and processor to implement the servo system to operate the compound actuator. The magnetic tape 11 of the present example may be provided in a tape cartridge or cassette 13 having a supply reel 12 or having both the supply and take up reels.

Figure 3:
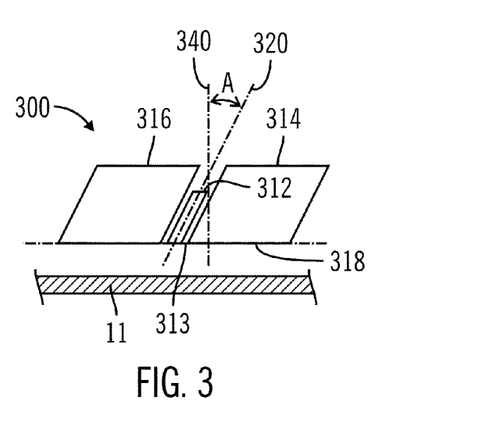
FIG. 3 illustrates an embodiment of a read element having a tilted sensing axis in accordance with the present description.

FIG. 3 shows in schematic form one example of a read element 300 of the tape head 15 which includes a thin film magnetoresistive (MR) sensor 312 disposed in a gap 313 between two shield layers 314, 316. The bottom surface 318 of the read element 300 of the head 15 is typically polished to provide a recording surface which faces the tape 11 or other recording medium, and reads data on the recording medium. In accordance with one aspect of the present description, the thin film of the sensor 312 defines a sensing axis 320 in the gap 313, wherein the sensing axis 320 is nonorthogonal to the recording surface 318 of the element 300. In one embodiment, the sensing axis 320 defines an angle A in a range from 10 to 60 degrees with respect to the normal 340 of the recording surface 318 of the element 300. The sensor 312 is sensitive to magnetic field variations which are parallel to the sensing axis 320. It is believed that the shield layers 314, 316, guide the magnetic fields under the read gap 313 towards the sensor 312 such that the sensed fields are primarily parallel to the sensing axis 320 of the sensor 312. Conversely, it is believed that the shield layers 314, 316 screen the sensor 312 from the magnetic fields of transitions that are not below the read gap 313. Notwithstanding the tilted orientation of the sensing axis 320 and the shield layers 314, 316, the sensor 312 is substantially sensitive to the vertical component of magnetic fields of transitions below the read gap 313.

Thus, in accordance with one aspect of the present description, it is believed that the sensing angle of the recording element may be tilted without substantial adverse effect on the reading capability of the read element. It is believed that a read element having a tilted sensing axis is suitable for use with a variety of types of recording media including tape, disks, etc.

As explained in greater detail below, it is believed that such a read element having a tilted sensing axis facilitates manufacturing. For example, it is believed that many read heads may be fabricated at the wafer level, thereby facilitating cost reduction. Still further, it is believed that a read element having a tilted sensing axis facilitates fabrication of two dimensional arrays of read elements on a wafer using conventional silicon fabrication processes. It is appreciated that other aspects may be realized in addition thereto or instead of these described herein, depending upon the particular application.

FIGS. 4a, 5a-5e, 6a-6e and 7a-7e show one example of operations to fabricate a read element for a recording head for a magnetic media storage system in accordance with one embodiment of the present description. A thin film read element such as the read element 300 may be fabricated using standard film deposition techniques used in the semiconductor industry including chemical vapor deposition, atomic layer deposition, sputtering, plating and standard processing techniques including lithography, etching, chemical mechanical polishing, etc.

Figure 5A:
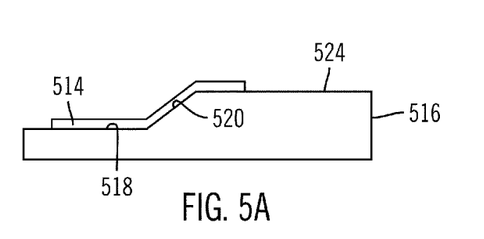
FIGS. 5a-5e are a side view illustrating one example of a process for forming a read element in accordance with the present description.
Figure 5B:
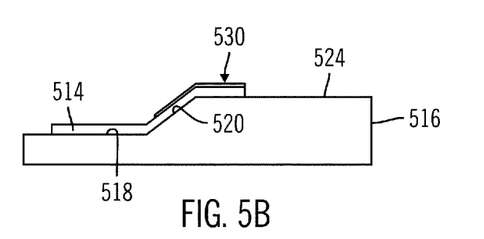
Figure 5C:
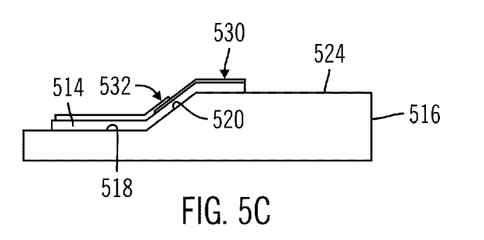
Figure 5D:
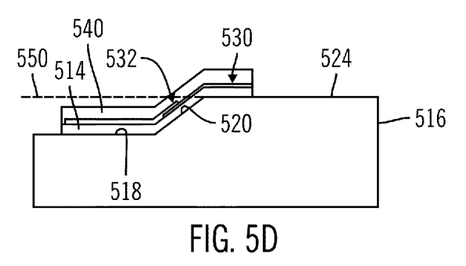
Figures 6A, 6B:
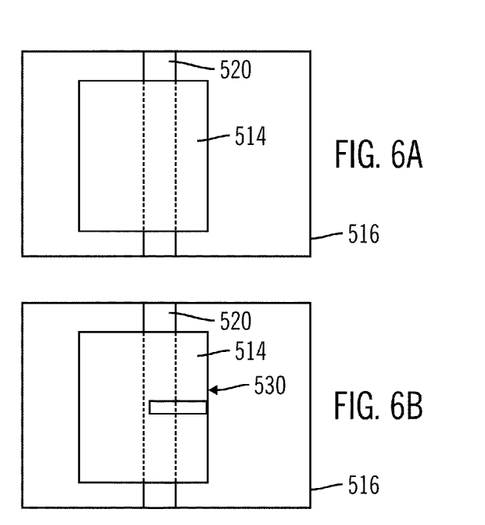
FIGS. 6a-6e are a top view illustrating one example of a process for forming a read element in accordance with the present description.
Figure 6C:
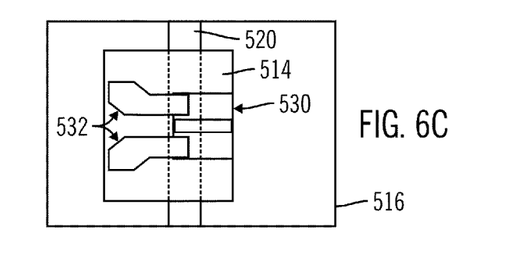
Figure 6D:
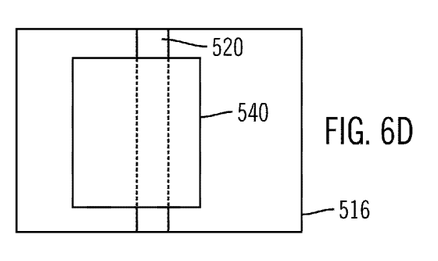
Figures 7A, 7B, 7C, 7D, 7E:
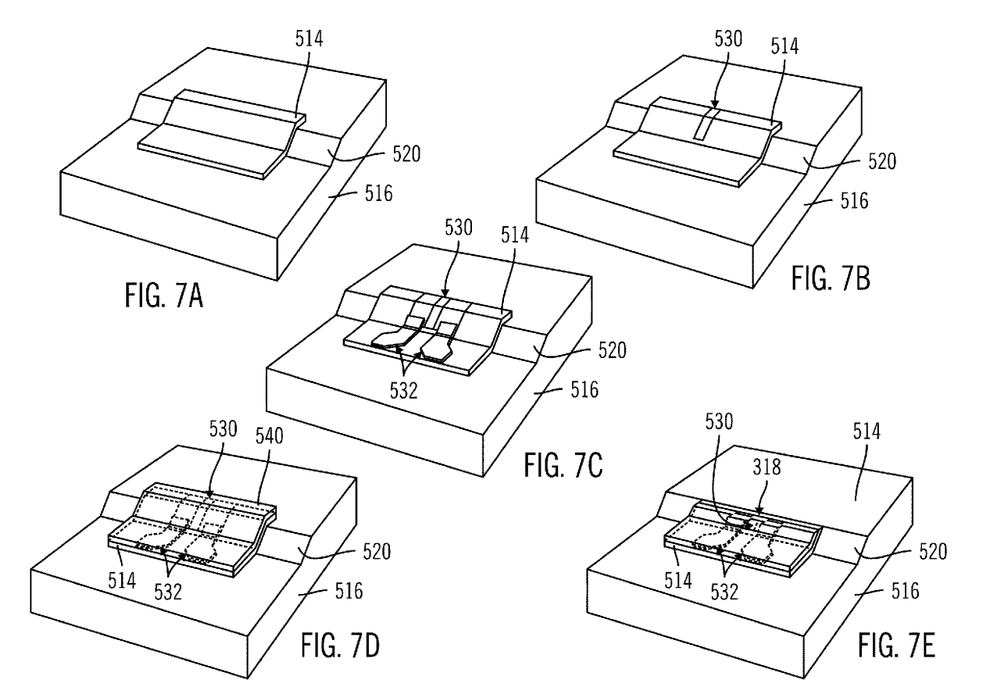
FIGS. 7a-e are a perspective view illustrating one example of a process for forming a read element in accordance with the present description.

In one operation, a wall is formed (block 400). In the illustrated embodiment, the wall extends from a surface of a substrate wherein the wall is tilted at an angle between 10 and 60 degrees with respect to the normal of the substrate surface. As used herein, the term "substrate" refers to a material on which the read element is formed. The term "substrate" includes a semiconductor material such as a silicon wafer or other semiconductor materials in forms other than wafers. The term substrate as used herein also refers to and may include materials deposited on the wafer including additional semiconductor materials, insulative materials, conductors and other layers deposited or otherwise formed. A first shield layer is deposited (block 405) on the tilted wall. FIGS. 5a, 6a, 7a show for example, a first shield layer 514 deposited on a substrate such as a wafer 516 suitable for thin film deposition. A common shield layer material is permalloy. It is appreciated that other types of shield layer materials including iron-nickel alloys may be used, depending upon the particular application. The first shield layer 514 is deposited primarily on a wall 520 of a groove 518 of the wafer 516. In accordance with the present description, the wall 520 is oriented at an angle A in a range from 10 to 60 degrees with respect to the normal 522 of the wafer overall planar surface 524. It is appreciated that other orientations of a deposition wall may be utilized. For example, it is appreciated that each of the embodiments described herein may alternatively include a deposition wall oriented so that the resulting sensor has a sensing axis oriented at an angle within a range of 5 to 85 degrees with respect to the normal of the recording surface. The particular angle may vary, depending upon the particular application.

In another operation, a plurality of layers (FIGS. 5b, 6b, 7b) forming a magneto-resistive sensor 530 are deposited (block 410) into the groove 518 and over the first shield layer 514. Depending upon the type of the thin film sensor, these layers may include one or more of magnetic layers including hard and free magnetic layers, intermediate layers, and pinning layers. Additional layers 532 associated with and deposited (FIGS. 5c, 6c, 7c) adjacent the sensor may include bias layers including hard bias layers, non-conducting layers and current lead layers. Suitable MR sensors include anisotropic magnetoresistive (AMR), giant magnetoresistive (GMR), and tunneling magnetoresistive (TMR) sensors, etc.

Figure 5E:
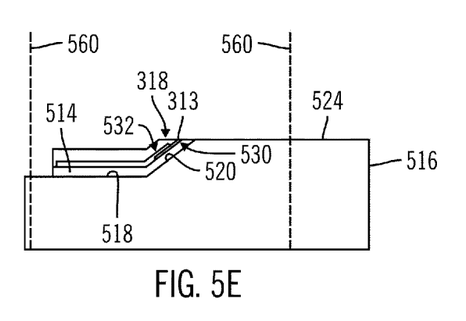
Figure 6E:
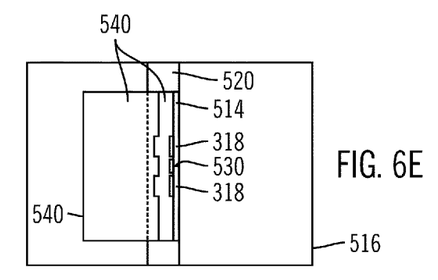

Following deposition of the layers of the thin film sensor 530, a second shield layer 540 (FIGS. 5d, 6d, 7d) is deposited (block 420) on the layers of the thin film sensor 530 and its associated layers 532. In another operation, prior to dicing the wafer 516, portions of the layers of the deposited read element and the wafer 516 above a level indicated in phantom by a line 550 may be removed to form (block 430) a recording surface 318 which includes a read gap 313 between the shield layers 514, 540, as indicated in FIGS. 5e, 6e, 7e. The recording surface 318 may also be coated with a head wear protection coating, such as carbon, for example, prior to dicing the wafer. These coatings can also be deposited at lithographically determined positions of the wafer using standard lithographic processes, for example. It is believed that these polishing and coating operations are facilitated by performing them on the wafer 516 before the wafer is diced into individual pieces.

Accordingly, following completion of the wafer level operations including polishing and coating operations, the wafer may be diced as represented by dicing lines 560 (FIG. 5e) to separate the read elements formed thereon into units of one or more recording elements each. For example, a row of read elements may be diced as an integral unit from a wafer to provide a row-bar of read elements disposed on an integral portion of the diced wafer. This row-bar may be attached to a flex cable and assembled into an actuator for track-following.

The orientation of the shield layers 514, 540 and the orientation of the layers of the sensor 530 between the shield layers 514, 540 adjacent the recording surface 318 defines a sensing axis 525 (FIG. 5d) between the shield layers 514, 540. The sensing axis 525 is generally parallel to the layers of the sensor 1112 adjacent the recording surface 318 and generally parallel to the shield layers 514, 540 adjacent the recording surface 318.

Figure 8A:
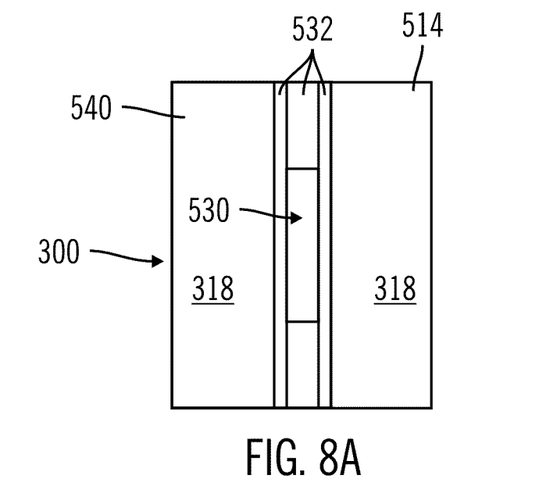
FIG. 8a is a view of a recording surface of one example of a read element in accordance with the present description.

FIG. 8a is a top view of one example of the read element 300 (FIG. 3) in the plane of the recording surface 318. As viewed in the plane of the recording surface, the read element 300 shown in FIG. 8a may be similar in appearance to the read element 1110 of the prior art depicted in FIG. 13. However, because the layers of the shields and sensor of the read element 300 are deposited onto the tilted wall 520 of the groove 518, the sensing axis 320 (FIG. 3) of the read element 300, like the wall 520, is nonorthogonal to the recording surface 318. In one example, the sensing axis 320 of the read element 300, may be oriented at an angle A in a range from 10 to 60 degrees with respect to the normal 340 of the recording surface 318 of the element 300 (and the surface of the tape 11 during operation). As set forth above, it is believed that such sensing angle tilting facilitates manufacturing without significantly adversely affecting performance. It is appreciated that other orientations may be utilized. For example, it is appreciated that each of the embodiments described herein may alternatively include a sensor having a sensing axis oriented at an angle within a range of 5 to 85 degrees with respect to the normal of the recording surface. The particular angle may vary, depending upon the particular application.

Figure 4A:
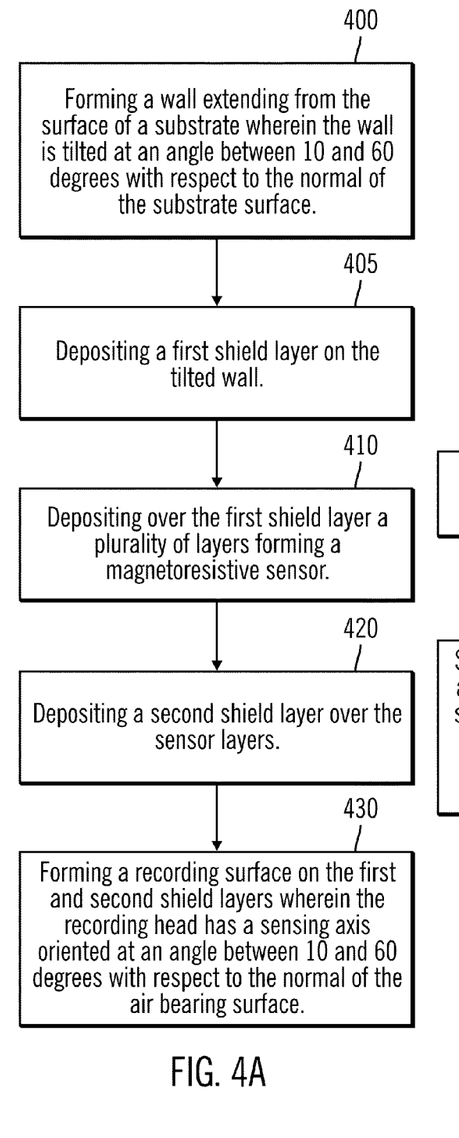
FIG. 4a illustrates one example of operations for forming a read element in accordance with the present description.
Figure 4B:
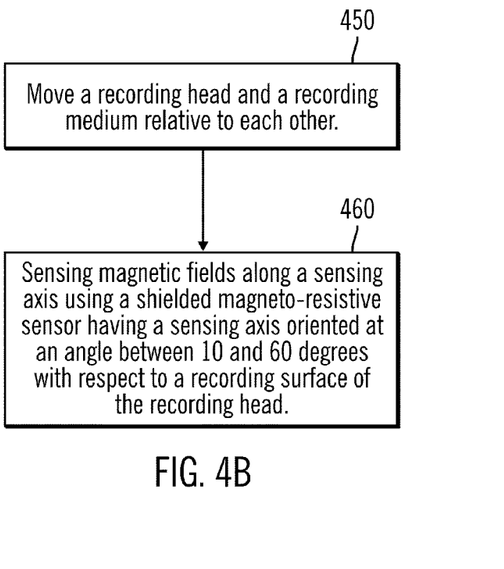
FIG. 4b illustrates one example of operations for operating a tape drive implementing a read element in accordance with the present description.

One example of operations for transferring data between a read head and a recording medium of a magnetic storage system utilizing a head having a read element in accordance with one aspect of the present description is shown in FIG. 4b. In one operation, the read head and the recording medium are moved (block 450) relative to each other. In the example of a tape drive system, the magnetic tape may be driven past the recording surface of the read head. In the example of a disk drive system, the magnetic disk may be rotated below the recording surface of the recording head. Magnetic fields are sensed (block 460) using a shielded magneto-resistive sensor of the read element having a sensing axis oriented at an angle between 10 and 60 degrees with respect to the normal of the recording surface of the recording head.

For example, in the tape drive 10, the magnetic tape 11 is moved along a tape path from the supply reel 12 in the magnetic cartridge 13 to the take up reel 14. The magnetic tape 11 is moved along the tape path in a longitudinal direction across the tape head 15 as shown in FIG. 2. The tape head is supported by an actuator 17 of a servo system, which, for example, may comprise a compound actuator. In the illustrated embodiment, the tape head 15 includes one or multiple read elements, each having a magneto-resistive sensor disposed between and shielded by first and second shields. The sensor has a sensing axis oriented at an angle between 10 and 60 degrees with respect to the normal of the recording surface of the head and with respect to the normal of the tape 11.

In the embodiment of FIGS. 5a-5e, 6a-6e, 7a-7e, the wafer 516 may be a silicon wafer which is anisotropically etched to form a surface feature having a wall tilted at an appropriate angle. Such surface features may include a groove such as the groove 518, a pit, a mesa or any other suitable surface feature having one or more tilted walls. It is appreciated that other surface feature forming techniques may be used, depending upon the particular application.

Also, in the embodiment of FIGS. 5a-5e, 6a-6e, 7a-7e, deposition of the films for the sensor may be made at a suitable angle such that deposition occurs on a wall of a particular groove, pit or other feature to optimize properties of the sensing device. It is appreciated that the angle of deposition may vary, depending upon the particular application. In one embodiment, the films may be deposited substantially simultaneously on all walls of the etch pit, groove or other surface structure, or at least those surfaces not covered by a resist or other coating intended to inhibit permanent deposition.

Figure 8B:
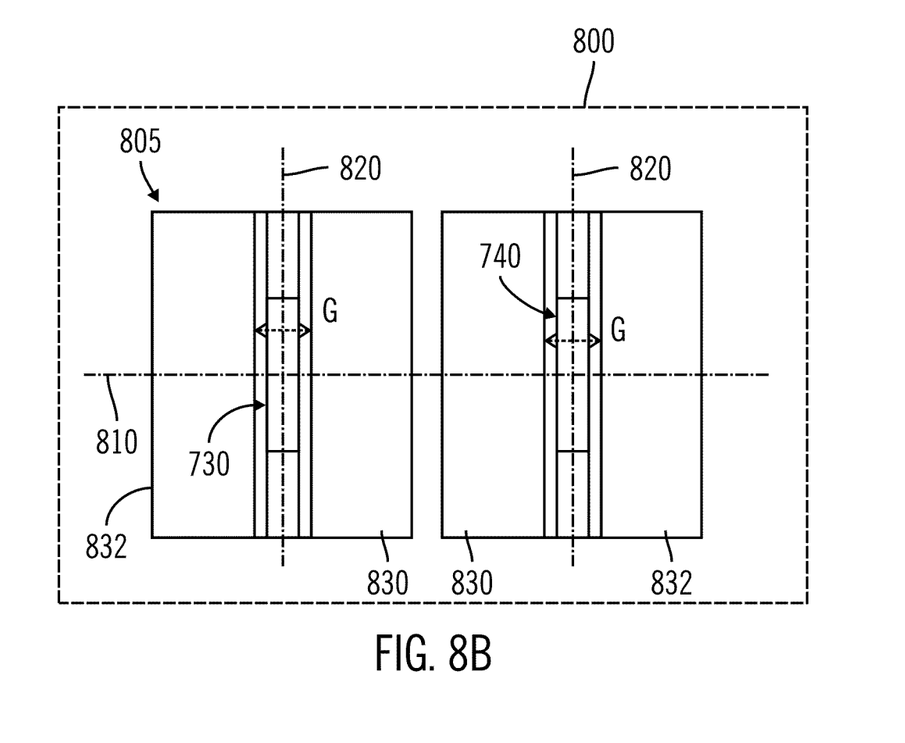
FIG. 8b is a view of the recording surfaces of an example of a pair of read elements in accordance with the present description.

A plurality of read elements may be deposited on the substrate in this manner. The position and dimensions of the sensors can be defined by lithography, etching or other suitable techniques. The grooves or via may be left open or may be filled with a suitable material such as, for example, a nonmagnetic, nonconducting material which facilitates electrical and magnetic separation of the deposited layers. The wafer may be polished and coated as discussed above to form multiple sensor elements. The wafer 7 may be diced with the sensors 730, 740 remaining in a unit 800 as shown in FIG. 8b. Alternatively, the sensors 730, 740 may be completely separated into different units diced apart. In one aspect, it is believed that the density of recording elements at the wafer level or at the unit level may be improved by such a deposition technique. As will be appreciated by those skilled in the art, the deposition parameters may be adjusted to accommodate the angle between the substrate and direction of deposition.

For example, deposition and lithography steps for the fabrication of the sensor can be adapted to a non-planar substrate. It is believed that improved results may be achieved if the angle of the wall being deposited upon is not too small and that the groove is not too deep. In addition, materials and deposition methods may vary, depending upon the angle of deposition. It is appreciated that the groove or other structure geometry (depth, length, width, separation) may be adjusted using suitable techniques including lithography and etching techniques. A suitable groove depth may be determined in accordance with the appropriate sensor thickness (both shields and MR element thicknesses). These parameters may also be optimized to achieve a suitable level of read performance.

The embodiment of FIG. 8b depicts an example of an array 805 of read elements 730, 740 of the unit 800, in which the sensors are arrayed aligned in a one dimensional array as indicated by the line 810. In addition, the read elements 730, 740 are oriented in parallel as indicated by the lines 820 which indicate the orientation of the gap G between the shields 830, 832, which is also the orientation of the layers of deposition of each read element 730, 740 in the plane of the recording surface 834.

In another aspect of the present description, a process for fabricating read elements in accordance with the present description also facilitates positioning the various read elements in a variety of arrangements, depending upon the particular design. As a consequence, an array of read elements may be fabricated at the wafer level in which the array is not limited to read elements which are all aligned or all parallel. It is believed that arranging read elements in two dimensional arrays can facilitate one or more of adjacent track reading, electronic track-following, and compensation for tape stability.

Figure 9A:
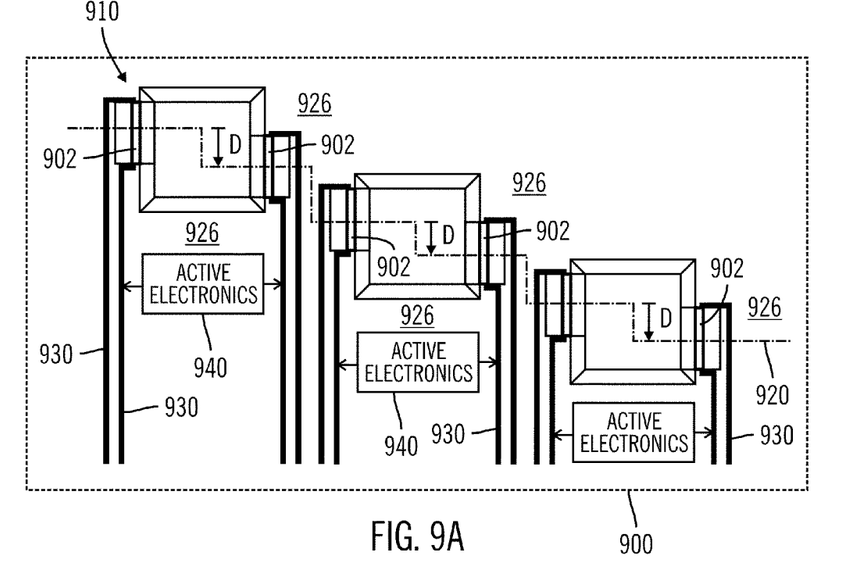
FIG. 9a is a top view of a substrate having an example of an array of read elements formed as a unit in accordance with the present description.

For example, FIG. 9a shows a unit 900 of read elements 902 in which the read elements 902 are oriented parallel to each other but are arranged in a staggered two dimensional array 910 in which the read elements are not aligned orthogonally but are offset with respect to each other by an offset D as shown by the line 920. The amount of offset between adjacent pairs of read elements need not be constant but may vary, depending upon the particular application.

The read elements 902 are deposited on walls of grooves 926. Thus, an array of read elements positioned in an appropriate pattern may be fabricated together as a unit at the wafer level by etching or otherwise forming long narrow grooves, slots or other suitable wafer features and using lithography and etching or other suitable feature forming techniques to define their width and spacing on the wafer. Thus, for example, locations of the read elements in a unit can be selected at the wafer level during anisotropic etching as the dimensions and the positions of the groove-edges can be controlled by lithography. It is appreciated that other feature forming techniques may be used to locate the positions of the sensors in a suitable array on the wafer prior to dicing the wafer.

Figure 10A:
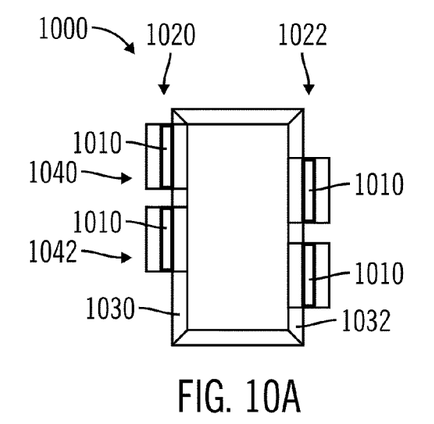
FIGS. 10a-10c are each a top view of examples of substrates having an alternative embodiment of an array of read elements formed as a unit in accordance with the present description.

FIG. 10a shows an example of a 4 by 4 array 1000 of read elements 1010 in which each column 1020, 1022 of read elements 1010 is formed on a single groove edge 1030, 1032. As a consequence, the orientations of each read element 1010 of a particular column is aligned. However, the rows 1040, 1042 of read elements 1010 of the array 1000 are nonorthogonal such that the read elements of each row 1040, 1042 are staggered or offset with respect to each other in the lateral direction of tape or disk movement.

Figure 10B:
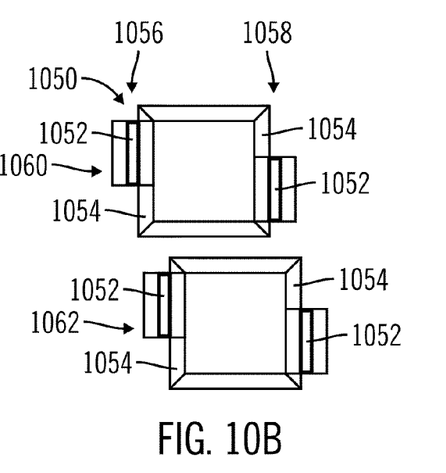

FIG. 10b shows an example of a 4 by 4 array 1050 of read elements 1052 in which each read element 1052 is formed on a different groove edge 1054. In this example, the groove edges 1054 are all parallel such that the orientations of the read elements 1052 are parallel to the other read elements 1052 of the array 1050. Each column 1056, 1058 of read elements 1010 is formed on groove edges 1054 which are offset relative to each other such that the read elements 1010 of each column are nonorthogonal, that is, staggered or offset with respect to each other in the longitudinal direction of tape movement. In addition, the rows 1060, 1062 of read elements 1052 of the array 1050 are also nonorthogonal such that the read elements of each row 1060, 1062 are staggered or offset with respect to each other in the lateral direction of tape movement or other recording medium movement.

Figure 10C:
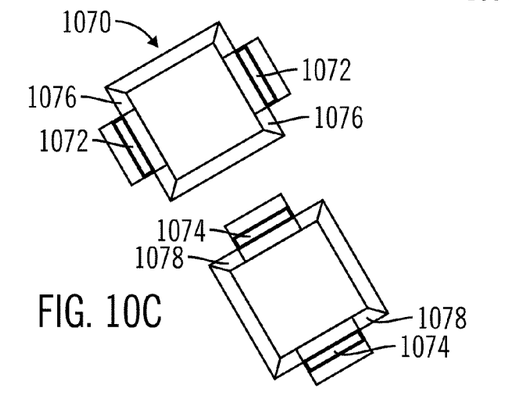

In the examples of FIGS. 10a, 10b, the orientations of read elements are parallel. It is appreciated that an array of read elements may be fabricated at the wafer level in which the orientations of the read elements are non-parallel, in transverse angles which include orthogonal or nonorthogonal, for example. FIG. 10c depicts an array 1070 of read elements 1072, 1074 in which the orientations of the read elements 1072 are parallel to each other, and the orientations of the read elements 1074 are parallel to each other and orthogonal to the orientations of the read elements 1072. The read elements 1072 are formed on parallel groove edges 1076 and read elements 1074 are formed on parallel groove edges 1078 which are orthogonal to groove edges 1076.

It is appreciated that the orientations of the read elements may have other relationships other than parallel and orthogonal and may include other angles, depending upon the particular applications. Having read elements turned at an angle with respect to each other and/or with respect to the direction of tape motion may facilitate azimuthal reading or other applications. A wide variety of groove edge orientations and hence read element orientations may be achieved by suitable lithography and etching processes or other suitable wafer-level transfer technologies, depending upon the particular application.

Figure 9B:
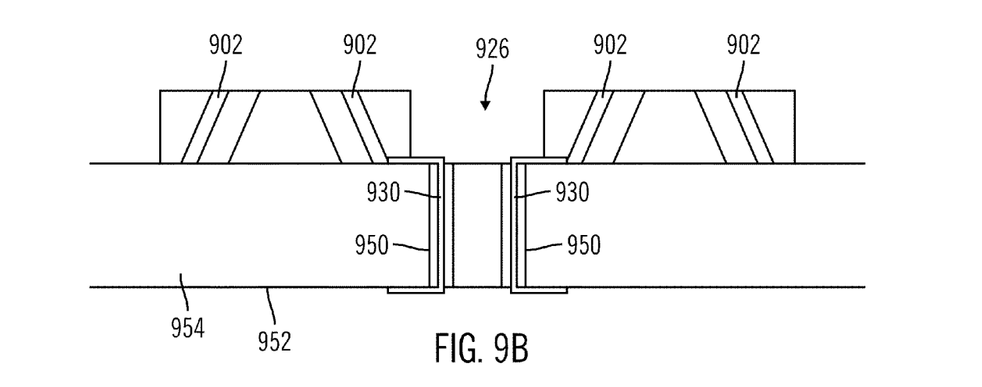
FIG. 9b is a side, cross-sectional view of an example of a substrate having an array of read elements formed as a unit in accordance with the present description.

In another aspect of the present description, electrical leads 930 and additional electronics 940 could be placed in the grooves 926 and electrically coupled to read elements 902 as shown in FIG. 9a, for example. Such electronics could include active circuitry such as signal processing circuitry to process electrical signals being provided to or received from the sensor of a read element. Other circuits may be added to facilitate switching between banks of read elements or between read elements. In addition to depositing circuitry, active devices could be joined to the head structure on the wafer using methods well known in silicon processing. Still further, vias or other apertures 950 (FIG. 9b), made with standard Si or other processes, could also be formed to carry electrical contacts and leads 930 to the back 952 of the wafer 954 for connection with drive or other electronics.

Following deposition and shaping of the read elements and associated leads and electronics, the leads and electronic devices in the grooves may be covered by filling the grooves or other recesses formed in the wafer surface by depositing a suitable thick filling layer prior to polishing by CMP or other polishing processes. In one embodiment, the electronic circuitry such as the active electronics 940 may be positioned in grooves below the level of the recording surface. In this manner, a suitably flat head surface may be achieved after polishing and prior to wafer dicing. As a result, significant flexibility for optimizing the head surface for tape support (for a tape head), for head-tape interface (stiction) or to create recording surface features close to the head, may be achieved at the wafer level prior to dicing the wafer.

The foregoing description of exemplary embodiments has been presented for the purposes of illustration and explanation. It is not intended to be exhaustive or to limit the description to the precise form disclosed. Many modifications and variations are possible in light of the above teaching.

What is claimed is:

1. A method, comprising:
   forming a read element for a head for a magnetic media storage system having magnetic media defining a track in which the magnetic media and a read element move relative to each other in a longitudinal direction along the track, comprising:
   depositing a first shield layer on a wall;
   depositing over said first shield layer a plurality of layers forming a magneto-resistive sensor;
   depositing a second shield layer over said sensor layers; and
   forming a head surface on said first and second shield layers and adapted to face the media;
   wherein said read element sensor is oriented at an angle in the longitudinal direction of movement along the track and wherein the angle is between 10 and 60 degrees with respect to the normal of said head surface.

2. The method of claim 1 wherein said wall extends from the surface of a substrate and is tilted at an angle between 10 and 60 degrees with respect to the normal of said substrate surface.

3. The method of claim 1 further comprising forming a signal processing circuit on said substrate below the level of said head surface of said head and coupling said circuit to at least one of an input and output of said read element.

4. The method of claim 3 wherein said read element and said signal processing circuit are formed in at least one groove in said substrate, and said wall is a wall of said groove.

5. The method of claim 1 wherein said substrate is a wafer, said head surface forming includes polishing said wafer, said head forming further including dicing said wafer to separate said head from said wafer after said wafer polishing.

6. The method of claim 5 wherein said head surface forming further includes depositing a head wear protection coating on said polished wafer prior to dicing said wafer.

7. The method of claim 5 further comprising forming a plurality of said heads on said wafer, each head having at least one read element, said head surface forming for each of said heads including polishing said wafer, said head forming further including dicing said wafer to separate said plurality of heads from said wafer after said wafer polishing.

8. The method of claim 7 wherein each head has a plurality of read elements.

9. The method of claim 7 further comprising forming grooves in said substrate, forming at least one of electrical leads and electronic devices in said grooves below the level of the surface of the head surface of a head, and electrically coupling at least one of the electrical leads and electronic devices in said grooves to said read element, prior to said wafer dicing.

10. The method of claim 7 further comprising forming a via in said wafer, forming electrical leads in said via, and coupling a read element disposed on a front side of the wafer to circuitry on a back side of the wafer prior to said wafer dicing.

11. The method of claim 5 wherein said first and second shield layers and said sensor form a read element of said head, said method further comprising forming a plurality of heads, each head having a plurality of said read elements in an array on an integral portion of the substrate of said wafer, said dicing including dicing said wafer to separate said heads from each other so that each array of head elements is separated from said wafer as an integral unit on said integral portion of the substrate.

12. The method of claim 11 wherein said array comprises a nonorthogonal array of said read elements in which the read elements are offset with respect to each other.

13. The method of claim 12 wherein said array further has at least one write element.

14. The method of claim 11 wherein a first plurality of said read elements are formed with a gap between the associated shield layers oriented in a first direction in the head surface, and a second plurality of said read elements are formed with a gap between the associated shield layers oriented in a second direction in the head surface.

15. The method of claim 1 wherein said head further has at least one write element.

16. The method of claim 1 wherein said magnetic media storage system is one of a magnetic tape storage system and a hard disk drive.

17. A method, comprising:
transferring data between a read element and a recording medium defining a track in which the recording medium and a read element move relative to each other in a longitudinal direction along the track, said transferring including:
sensing magnetic fields using a shielded magneto-resistive sensor of the read element, the read element sensor being oriented at an angle in the longitudinal direction of movement along the track and wherein the angle is between 10 and 60 degrees with respect to the normal of a head surface of the head adapted to face the recording medium.

18. The method of claim 17 wherein said sensor is disposed between two shield layers which form said head surface.

19. The method of claim 18 wherein a first plurality of said read elements are formed with a gap between the associated shield layers oriented in a first direction in the head surface, and a second plurality of said read elements are formed with a gap between the associated shield layers oriented in a second direction in the surface.

20. The method of claim 17 wherein said recording medium is a magnetic tape, said transferring further including transporting said tape longitudinally past said recording head from a first reel to a second reel.

21. The method of claim 20 wherein said transferring includes transferring data between a read element of said head and a plurality of longitudinal tracks of said tape, said transferring further including actuating the head to move laterally from one track to another track of said tape.

22. The method of claim 17 wherein said data transferring includes transferring data between a plurality of read elements of the head wherein the read elements are formed in an array on an integral substrate, wherein each read element of the array performs:
sensing magnetic fields using a shielded magneto-resistive sensor of the element, the read element having a sensing axis oriented at an angle between 10 and 60 degrees with respect to the normal of the head surface of the head.

23. The method of claim 22 wherein said array is a nonorthogonal array of said read elements in which the read elements are offset with respect to each other.

24. The method of claim 22 further comprising processing an electrical signal for the head using processing circuitry disposed on the substrate below the head surface level.

25. A device, comprising:
a read element for a head for a magnetic media storage system having magnetic media defining a track in which the magnetic media and a read element move relative to each other in a longitudinal direction along the track, comprising:
first and second shields;
a head surface adapted to face the media; and
a magneto-resistive sensor disposed between and shielded by said first and second shields, said sensor being oriented at an angle in the longitudinal direction of movement along the track and wherein the angle is between 10 and 60 degrees with respect to the normal of said head surface.

26. The device of claim 25 further comprising a substrate on which said head is formed, and a signal processing circuit formed on said substrate adjacent said read element and coupled to at least one of an input and output of said read element.

27. The device of claim 25 wherein said head further has at least one write element.

28. The device of claim 25 wherein said first and second shields and said sensor form a read element of said head, said head further comprising a substrate and a plurality of read elements formed in an array as an integral unit on said substrate, each read element comprising first and second shields, and a magneto-resistive sensor disposed between and shielded by said first and second shields of the associated read element, said sensor of each element having a sensing axis oriented at an angle between 10 and 60 degrees with respect to the normal of said head surface of said head.

29. The device of claim 28 wherein said array is a nonorthogonal array of said read elements in which the read elements are offset with respect to each other.

30. The device of claim 28 wherein a first plurality of said read elements are formed with a gap between the associated shields oriented in a first direction in the head surface, and a second plurality of said read elements are formed with a gap between the associated shield oriented in a second direction in the head surface, transverse to said first direction.

31. The device of claim 25 wherein said magnetic media storage system is one of a magnetic tape storage system and a hard disk drive.

32. A magnetic storage system for use with a magnetic recording medium defining a track in which the magnetic recording medium and a read element move relative to each other in a longitudinal direction along the track, comprising:
 a head with multiple read elements, each read element having first and second shields; a head surface adapted to face said recording medium; and a magneto-resistive sensor disposed between and shielded by said first and second shields, said sensor being oriented at an angle in the longitudinal direction of movement along the track and wherein the angle is between 10 and 60 degrees with respect to the normal of said head surface;
 a drive adapted to move said recording medium across said head adjacent to said head surface and in the longitudinal direction along the track; and
 an actuator adapted to move the head in a lateral direction relative to tracks of the recording medium.

33. The system of claim 32 wherein said head further has at least one write element.

34. The system of claim 32 further comprising a substrate on which said head is formed, and a signal processing circuit formed on said substrate adjacent said read elements and coupled to at least one of an input and output of said read elements.

35. The system of claim 32 wherein said first and second shields and said sensor form a read element of said head, said head further comprising a substrate and a plurality of read elements formed in an array as an integral unit on said substrate, each read element comprising first and second shields, and a magneto-resistive sensor disposed between and shielded by said first and second shields of the associated read element, said sensor of each element having a sensing axis oriented at an angle between 10 and 60 degrees with respect to the normal of said head surface of said head.

* * * * *